United States Patent
Nihei et al.

[11] Patent Number: 5,466,909
[45] Date of Patent: Nov. 14, 1995

[54] LASER ROBOT WITH APPROACH TIME FROM ORIGIN TO A STARTING POSITION MINIMIZED

[75] Inventors: Ryo Nihei; Akihiro Terada, both of Fujiyoshida; Yasuo Sasaki, Minamitsuru, all of Japan

[73] Assignee: Fanuc Ltd, Yamanashi, Japan

[21] Appl. No.: 284,431

[22] PCT Filed: Dec. 10, 1993

[86] PCT No.: PCT/JP93/01798

§ 371 Date: Aug. 10, 1994

§ 102(e) Date: Aug. 10, 1994

[87] PCT Pub. No.: WO94/13425

PCT Pub. Date: Jun. 23, 1994

[30] Foreign Application Priority Data

Dec. 14, 1992 [JP] Japan .................... 4-333036

[51] Int. Cl.[6] .................................. B23K 26/00
[52] U.S. Cl. .......................... 219/121.72; 219/121.6; 219/121.67; 364/474.08
[58] Field of Search ............. 219/121.6, 121.61, 219/121.62, 121.67, 121.72, 121.83, 121.85, 121.79, 121.81, 121.78; 364/474.08

[56] References Cited

U.S. PATENT DOCUMENTS 4,169,976  10/1979  Cirri ......................... 219/121.72
5,293,024   3/1994  Sugahara et al. ........... 219/121.67

FOREIGN PATENT DOCUMENTS

| 63-56982 | 4/1988 | Japan . | |
|---|---|---|---|
| 63-104793 | 5/1988 | Japan . | |
| 63-295085 | 12/1988 | Japan | 219/121.72 |
| 3-254379 | 11/1991 | Japan | 219/121.6 |
| 4-13490 | 1/1992 | Japan | 219/121.6 |
| 5-212546 | 8/1993 | Japan | 219/121.72 |

Primary Examiner—Geoffrey S. Evans
Attorney, Agent, or Firm—Nikaido, Marmelstein, Murray & Oram

[57] ABSTRACT

In carrying out precision laser-beam machining by using a laser-beam machining head driven by an additional motion-axis means 8 of a laser robot unit 1, a CPU accommodated in a robot controller 10 calculates time A+B necessary for a laser beam projecting nozzle to travel a distance between a position corresponding to a position of origin OR of a machining locus and a position corresponding to a starting point E on the machining locus at a quick-feed speed, and time C necessary for the laser beam projecting nozzle to travel the same distance in a laser-beam machining mode not including quick-feed operation, compares the times A+B and C, and provides feed motors MA and MB accommodated in the additional motion-axis means 8 with an automatic quick-feed command, when the time A+B is shorter than the time C to thereby enhance an efficiency of the laser machining operation.

5 Claims, 5 Drawing Sheets

TO THE ROBOT
CONTROLLER

LASER ROBOT WITH APPROACH TIME FROM ORIGIN TO A STARTING POSITION MINIMIZED

TECHNICAL FIELD

The present invention relates to a laser machining method employing a multi-articulated laser:equipped robot having a plurality of axes of motion (an axis about which one of the movable elements of an industrial robot has a degree of freedom of motion is referred to as an axis of motion.), and a multi-articulated laser robot provided with a control apparatus for carrying out the method. More particularly, it relates to a laser-beam machining method that feeds a laser-beam projecting unit, attached to the extremity of a laser robot, by the controlling operation of an additional motion- axis mechanism, incorporating therein two feed motors, along a narrow machining locus of a small diameter to thereby efficiently machine a workpiece with a laser beam projected through a laser beam projecting nozzle on the laser beam projecting unit, and a multi-articulated laser robot suitable for carrying out the laser-beam machining method.

BACKGROUND ART

A laser robot, particularly a well-known multi-articulated laser robot having freedom of motion about six axes, is provided with a robot wrist, i.e., one of the movable elements of the robot, attached to the extremity thereof. The robot is further provided with an additional-axis mechanism including two drive motors and moves a laser beam projecting unit along a predetermined path, i.e., a feed path, in a biaxial coordinate plane using the additional motion-axis mechanism. Such a laser robot capable of forming a precision small hole in a workpiece by feeding the laser beam projecting unit along a circular feed path having a small diameter has been proposed and put into practical use for laser-beam machining.

A multi-articulated laser robot provided with the above-mentioned additional motion-axis mechanism has a robot unit as shown in FIG. 1, and the operation of the robot unit is controlled by a well-known robot controller for implementing the desired laser-beam machining.

The robot unit 1 has a robot base 2, a robot body 3 set upright on the robot base 2, a turning robot body 4 turnably joined to the upper part of the robot body 3, a robot upper arm 5 pivotally joined for rotating about a horizontal axis to one end of the turning robot body 4, a robot forearm 6 pivotally joined, for rotating about a horizontal axis relative to the robot upper arm 5, to the extremity of the robot upper arm 5, a robot wrist 7 having three degrees of freedom of motion, joined to the extremity of the robot forearm 6 and capable of rotatinging about three axes perpendicular to one another in a three-dimensional space, and an additional motion-axis mechanism 8 attached to the robot wrist 7 and holding a laser-beam machining head 9 including a laser beam projecting device that projects a laser beam for laser-beam machining.

The additional motion-axis mechanism 8 is provided with two built-in drive motors, such as servomotors, not shown, and controls the laser-beam projecting nozzle 9a of the laser-beam machining head 9 for movement, for example, along a desired path in an orthogonal biaxial coordinate plane according to commands provided by the robot controller so as to carry out laser-beam machining of a workpiece by the use of a laser beam for cutting, boring and such.

The additional motion-axis mechanism 8 is mainly used as a mechanism specially for forming small holes with the laser-beam machining head 9. The additional motion-axis mechanism 8 holds the laser beam projecting nozzle 9a at a predetermined position of origin while the movable elements of the six-axis system (the revolving robot body 4, the robot upper arm 5, the robot forearm 6 and the robot wrist 7) of the robot unit 1 are in operation, and the two drive motors of the additional motion-axis mechanism 8 are actuated after the laser beam projecting nozzle 9a of the laser-beam machining head 9 has been positioned by the robot unit 1 at the center of a small hole to be formed so as to move the laser beam projecting nozzle 9a of the laser-beam machining head 9 along a machining locus, such as a circular locus, corresponding to the circumference of the desired small hole to form the small hole by laser-beam machining.

When feeding the laser beam projecting nozzle 9a of the laser-beam machining head 9 to form such a small hole, the additional-axis mechanism 8 positions and stops the laser beam projecting nozzle 9a at a position of origin, moves the laser beam projecting nozzle 9a for a straight approach travel from the origin position to a position corresponding to a point on a desired machining locus, and then feeds the laser beam projecting nozzle 9a along the desired machining locus to complete the operation of laser-beam machining.

Generally, in such a laser-beam machining process, the workpiece is initially pierced therethrough by a laser beam, and then the laser beam projecting nozzle 9a is moved along the machining locus to cut the workpiece by the laser beam. A laser-beam machining method shown in FIG. 6 carries out piercing at the position of origin and another laser-beam machining method shown in FIG. 7 carries out piercing at a predetermined piercing position near a desired machining locus, such as a position where the edge of a through-hole formed by piercing by the laser beam does not cross the machining locus, moves the laser beam for an approach travel toward the machining locus, and then, moves the laser beam along a machining locus for laser-beam machining.

The former laser-beam machining method moves the laser beam projecting nozzle 9a of the laser-beam machining head 9 from the position of origin to a position corresponding to a point on the desired machining locus at a predetermined comparatively low machining speed along a straight path for an approach travel, and then moves the laser beam projecting nozzle 9a along the machining locus at a low machining speed for laser-beam machining. Therefore, this laser-beam machining method takes more machining time and hence the machining efficiency, i.e., machining rate, is rather low.

The latter laser-beam machining method moves the laser beam projecting nozzle 9a at a quick-feed speed from the origin position to the predetermined piercing position near the desired machining locus, carries out piercing at the piercing position, and then carries out laser-beam machining at a machining speed lower than the quick-feed speed. Therefore, this laser-beam machining method is seemingly able to carry out laser-beam machining at an improved machining efficiency. Practically, it is not necessarily true that the latter laser-beam machining method is able to complete a laser-beam machining process in less time than that required by the former laser-beam machining method, because the latter laser-beam machining method needs to position the laser beam projecting nozzle 9a at the predetermined piercing position near the machining locus and needs to execute more positioning operations than the former laser-beam machining method.

Accordingly, the selection of either a laser-beam machining method that starts laser-beam machining from the position of origin at a low machining speed and continues laser-beam machining without increasing the low machining speed or a laser-beam machining method that moves the laser beam projecting nozzle at a quick-feed speed from the position of origin to the predetermined piercing position on the approach path, and then carries out laser-beam machining at a low machining speed has been determined by the operator by a trial-and-error method or by a rule of thumb. The above-mentioned selection of a laser-beam machining method has the inevitable disadvantage that the laser-beam machining cannot be carried out at the highest possible machining efficiency.

The selection of a laser-beam machining method by the operator by a trial-and-error method or by a rule of thumb is an impediment to the promotion of automation of laser-beam machining by means of a laser robot.

DISCLOSURE OF THE INVENTION

Accordingly, an object of the present invention is to provide a laser-beam machining method capable of eliminating the disadvantages of, and solving problems encountered in, the conventional laser-beam machining method using the additional motion-axis mechanism of a laser robot, and a multi-articulated laser robot provided with a control means enabling implementation of the laser-beam machining method.

Another object of the present invention is to provide a laser-beam machining method capable of automatically carrying out laser-beam machining using the additional motion-axis mechanism on a laser robot at a high machining efficiency, and a control means indispensable for carrying out the laser-beam machining method of the present invention.

In view of the foregoing objects, when carrying out precision laser-beam machining by moving the laser beam projecting nozzle of a laser-beam machining head (laser beam projecting device), which is positioned and held beforehand at a position corresponding to a position of origin of a machining locus by the operation of the movable components of the laser robot, along the machining locus with the two drive motors of the additional motion-axis mechanism of the laser robot, first the present invention calculates the time necessary for moving the laser beam projecting nozzle along a straight approach path from the position corresponding to the origin position to a position corresponding to a point on the machining locus by a laser-beam machining mode in which laser-beam machining is started after carrying out piercing operation at the original position and the time necessary for moving the laser beam projecting nozzle along a straight approach path from the position corresponding to the origin position to a position corresponding to a point on the machining locus in another laser-beam machining mode in which the laser beam projecting nozzle is moved along a straight approach path from the position corresponding to the origin position to a position corresponding to a predetermined piercing point on the straight approach path at a comparatively high quick-feed speed, piercing operation is carried out at the piercing point, and then laser-beam machining is carried out at a comparatively low machining speed, on the basis of known conditions for the operation of the laser robot and the additional motion-axis mechanism, including the distance between the origin position and the position corresponding to the point on the desired machining locus, the machining speed, the quick-feed speed, the time constant corresponding to time necessary for the moving speed of the laser beam projecting nozzle to increase from zero to the predetermined machining speed, and the time constant corresponding to time necessary for the moving speed of the laser beam projecting nozzle to increase from zero to the predetermined quick-feed speed, compares the calculated necessary times, gives a quick-feed command automatically to the additional motion-axis mechanism to carry out laser-beam machining only when the necessary time required by the laser-beam machining mode in which the laser beam projecting nozzle is moved to the predetermined piercing position at a quick-feed speed is shorter than the other necessary time.

The present invention provides a laser-beam machining method that feeds the laser beam projecting nozzle of a laser robot for a straight approach travel with two drive motors along a straight approach path from a position corresponding to a predetermined position of origin on a workpiece to a position corresponding to the starting position of a desired machining locus, and feeds the laser beam projecting nozzle from the position corresponding to the starting position along the desired machining locus, comprising:

presetting a distance R for the straight approach travel, a quick-feed speed V0, a machining speed V1, a time constant corresponding to time necessary for the feed speed to increase from zero to the set quick-feed speed, and a time constant corresponding to time necessary for the machining speed to increase from zero to the set machining speed as machining conditions;

calculating first approach time necessary for machining the workpiece with a laser beam from the position of origin selected as a piercing position where the laser beam projected through the laser beam projecting nozzle pierces the workpiece to the starting position on the desired machining locus at a predetermined machining speed along the straight approach path, on the basis of the machining conditions;

calculating second approach time necessary for selecting a predetermined piercing position near the starting position on the straight approach path, quick-feeding the laser beam projecting nozzle from a position corresponding to the position of origin to a position corresponding to the predetermined piercing position at a quick-feed speed higher than the predetermined machining speed, and carrying out laser beam machining, after piercing the workpiece, from a predetermined point on the straight approach path to the starting position at the machining speed by feeding the laser beam projecting nozzle along a straight path on the basis of the machining conditions;

comparing the first approach time and the second approach time; and quickly feeding the laser beam projecting nozzle from the position corresponding to the position of origin to the position corresponding to the predetermined piercing position only when the second approach time is shorter than the first approach time.

The present invention also provides a multi-articulated industrial robot including a multi-articulated robot unit, an additional motion-axis means for feeding a laser beam projecting nozzle of a laser beam projecting means provided on the robot unit for a straight approach travel with two drive motors along a straight approach path from a position corresponding to a predetermined position of origin on a workpiece to a position corresponding to a starting position of a desired machining locus, and feeding the laser beam projecting nozzle from the position corresponding to the starting position along the desired machining locus, and control means for controlling the operation of the additional motion-axis means, wherein the control means comprises:

a storage means capable of presetting a distance R for the straight approach travel, a quick-feed speed V0, a machining speed V1, a time constant corresponding to time necessary for the feed speed to increase from zero to the set quick-feed speed V0, and a time constant corresponding to time necessary for the machining speed to increase from zero to the set machining speed V1 for the machining conditions, and of storing the preset machining conditions;

a calculating means capable of calculating a first approach time necessary for machining the workpiece, using a laser beam, from the position of origin selected as a piercing position where the laser beam projected through the laser beam projecting nozzle pierces the workpiece to the starting position of the desired machining locus at a predetermined machining speed along a straight path and second approach time necessary for selecting a predetermined piercing position near the starting position on the straight approach path, quick-feeding the laser beam projecting nozzle from a position corresponding to the position of origin to a position corresponding to the predetermined piercing position at a quick-feed speed higher than the predetermined machining speed, and carrying out laser-beam machining, after piercing the workpiece, from a predetermined point on the straight approach path to the starting position at the machining speed by feeding the laser beam projecting nozzle along a straight path, on the basis of the machining conditions stored in the storage means; and a command control means which gives a quick-feed command to the two drive motors only when the second approach time is shorter than the first approach time.

In accordance with the above-mentioned control means, the first approach time and the second approach time are calculated by the calculating means, and the quick-feed operation is executed automatically according to a command provided by the command control means only when the second approach time required by a laser-beam machining process including quick-feed operation is shorter than the first approach time. Therefore, the additional motion-axis means always feeds the laser-beam machining head with high efficiency and, consequently, laser-beam machining, particularly, precision laser-beam machining for forming a small hole by using the additional motion-axis means can be achieved with high efficiency.

BRIEF DESCRIPTION OF THE DRAWINGS

The above and other objects, features and advantages of the present invention will be made more apparent hereinafter from the description of preferred embodiments thereof with reference to the accompanying drawings wherein.

BEST MODE FOR CARRYING OUT THE INVENTION

Figure 1:
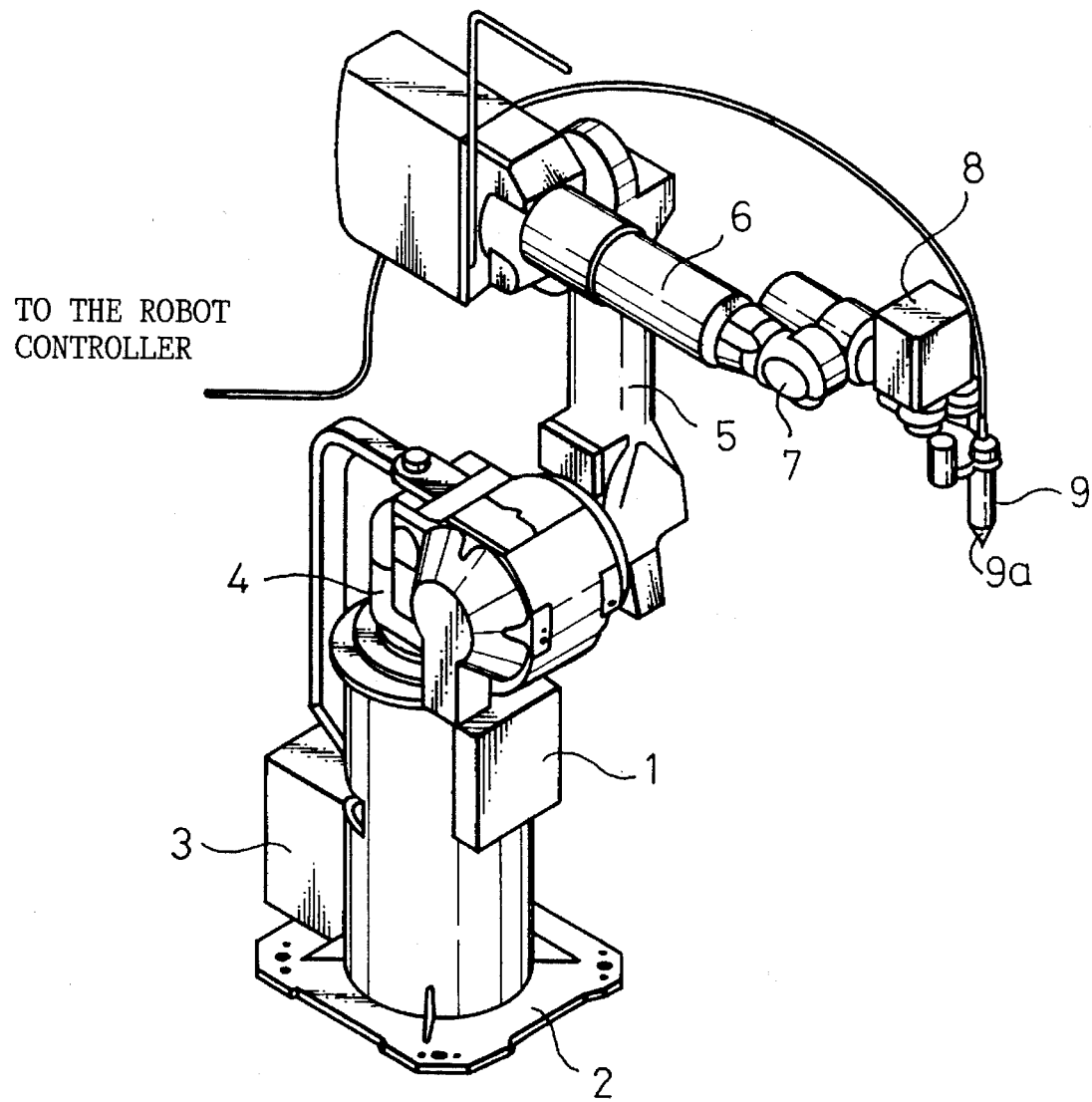
FIG. 1 is a front view illustrating a general construction of a laser robot unit of a multi-articulated laser robot provided with an additional motion-axis means.
Figure 2:
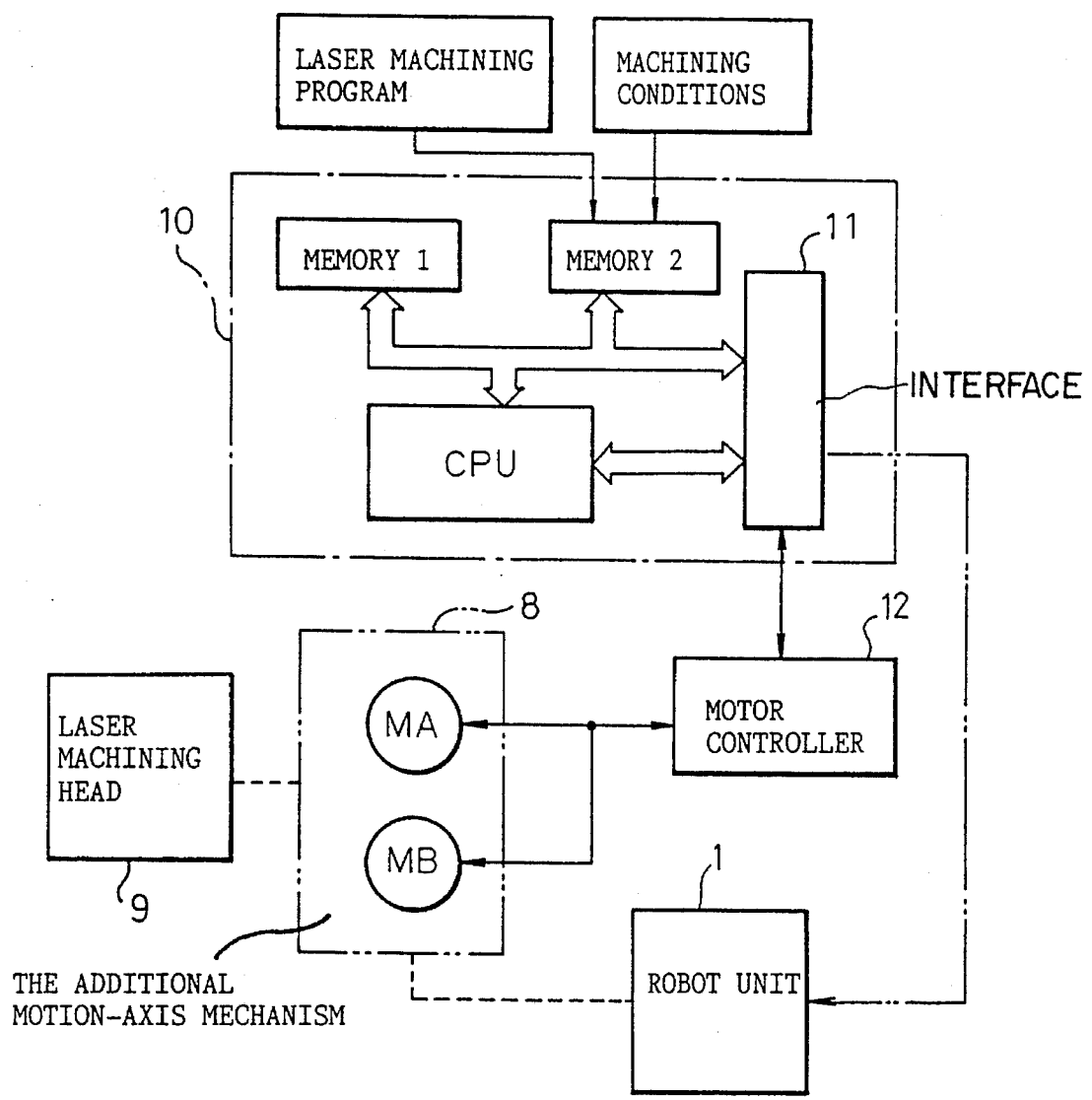
FIG. 2 is a block diagram of a control means for controlling a multi-articulated laser robot so as to carry out a laser-beam machining method in accordance with the present invention.

Referring to FIG. 2, a robot controller 10 is connected by signal lines, indicated by a line consisting of alternating single long and double short dashes to a robot unit 1 to move or position a laser-beam machining head 9 provided with a laser beam projecting device connected to an additional-axis mechanism 8 attached to a robot wrist 7 (FIG. 1) by controlling the operation of the movable components of the robot unit. The robot controller 10 has a built-in first memory (MEMORY 1), i.e., a ROM, storing basic programs for robot control and such, and a rewritable second memory (MEMORY 2) i.e., a RAM, for storing laser-beam machining programs entered by operating an input means. The robot controller 10 controls the movable components of the robot unit 1 through a CPU and an interface 11 according to the programs stored in the first and second memories.

Machining conditions for precision laser-beam machining, in which the laser-beam machining head 9 is fed by an additional motion-axis mechanism 8 according to the present invention, such as a distance R for a straight approach travel of the laser beam projecting nozzle 9a (FIG. 1) of the laser-beam machining head 9 between a position corresponding to a position of origin and a position corresponding to a point on a machining locus, a predetermined quick-feed speed V0, a time constant corresponding to time necessary for feed speed to increase from zero to the quick-feed speed, and such, for forming a small hole and the like are stored beforehand in the second memory 2 of the robot controller 10. If required, necessary data can be fetched from the laser-beam machining programs during precision laser-beam machining operation; for example, a laser-beam machining speed V1 among those set for the laser-beam machining programs can be used.

The additional motion-axis mechanism 8 is a driving mechanism provided with two drive motors MA and MB, i.e., servomotors, and is capable of accurately controlling the operation for moving the laser-beam machining head 9 in an orthogonal, biaxial coordinate system. The additional-axis mechanism 8 is used for the aforesaid precision laser-beam machining for forming a small hole or the like. This laser-beam machining is more precise than the laser-beam machining which can be carried out by moving the laser-beam machining head 9 along a predetermined machining locus by operating the movable components of the robot unit 1, i.e., the revolving robot body, the robot upper arm, the robot forearm and the robot wrist of the robot unit 1.

The drive motors MA and MB of the additional motion-axis mechanism 8 are controlled by a motor controller 12. The motor controller 12 is connected to the robot controller 10 and sends control signals to the drive motors MA and MB of the additional motion-axis mechanism 8 according to command signals sent thereto from the robot controller 10.

The enhancement of the efficiency of a laser-beam machining method according to the present invention to be carried out by operating the laser-beam machining head 9 by the additional motion-axis mechanism 8 according to the control operation of the robot controller 10 will be described hereinafter.

Figure 3:
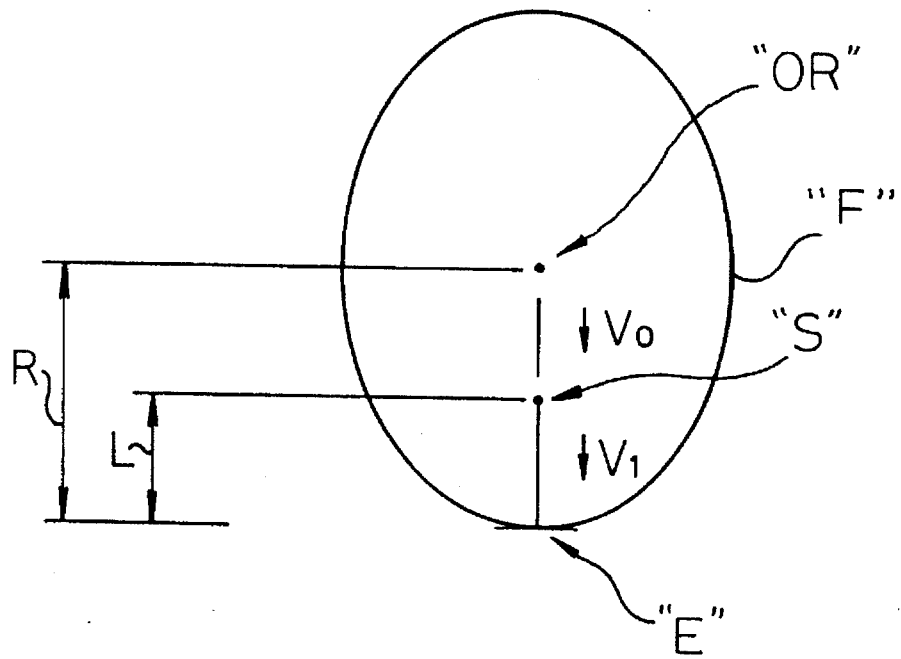
FIG. 3 is a diagrammatic view of a locus along which the laser beam projecting nozzle of a multi-articulated laser robot is moved by an additional motion-axis means when the laser-beam machining method of the present invention is carried out in a laser-beam machining mode including quick-feed operation.
Figure 4:
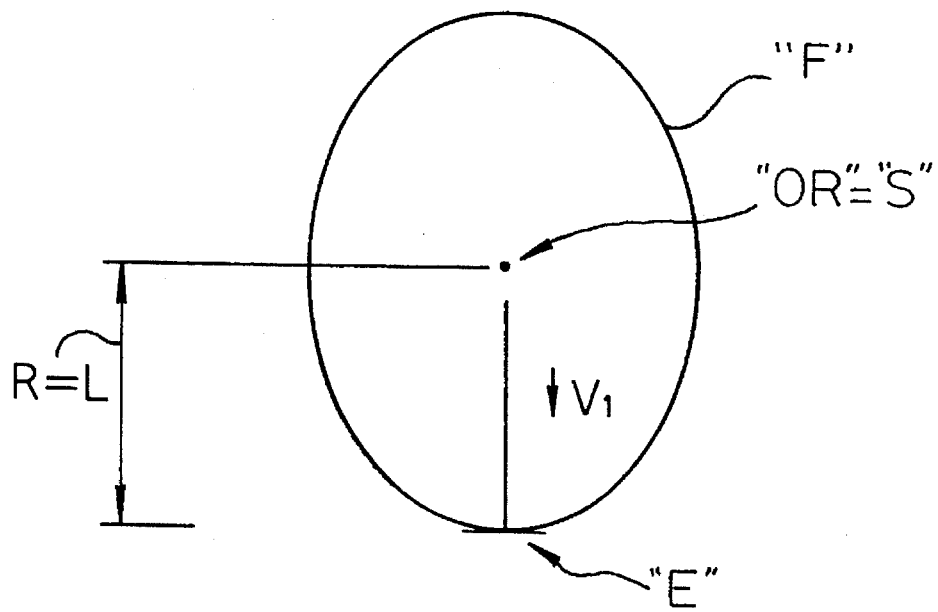
FIG. 4 is a diagrammatic view of a locus along which the laser beam projecting nozzle of a multi-articulated laser robot is moved by an additional motion-axis means when the laser-beam machining method of the present invention is carried out in another laser-beam machining mode not including quick-feed operation.

FIGS. 3 and 4 show two laser-beam machining modes, in which the movement of the laser-beam machining head 9 is controlled by the additional motion-axis mechanism 8, as applied, by way of example, to forming an elliptic hole in a workpiece by laser-beam machining. Naturally, the highly efficient laser-beam machining method of the present invention is applicable also to forming holes other than the elliptic hole, such as truly circular holes and square holes.

When the laser beam projecting nozzle 9a of the laser-beam machining head 9 is to be controlled so as to travel along an elliptic machining locus F shown in FIGS. 3 and 4, first the movable components of the robot unit 1 are operated to position the laser beam projecting nozzle 9a of the laser-beam machining head 9 at a position corresponding to the central position OR of the machining locus F. During this laser beam projecting nozzle positioning operation, the additional motion-axis mechanism 8 stops and holds the laser beam projecting nozzle 9a of the laser-beam machining head 9 at its position of origin using the drive motors MA and MB.

In the case shown in FIG. 3, the laser beam projecting nozzle 9a is moved at a quick-feed speed V0 from a position corresponding to the central position OR of the machining locus F to a position corresponding to a predetermined point, i.e., a piercing point S, on a straight approach path having a length corresponding to the distance R, a piercing operation is carried out at the piercing point S, and then the laser beam projecting nozzle 9a is moved at a machining speed V1 lower than the quick-feed speed V0 from the piercing point S to a laser-beam machining starting point E on the machining locus F along a final approach section, having a length corresponding to a distance L of the approach path, and along the machining locus F for laser-beam machining.

In the case shown in FIG. 4, the central position OR of the machining locus F is used as the piercing point S, piercing is carried out by the laser beam projected by the laser-beam machining head 9 at the piercing point S, and then laser-beam machining is started from the piercing point S without moving the laser beam projecting nozzle 9a at the quick-feed speed, to move the laser beam projecting nozzle 9a at the slower machining speed V1 through the laser-beam machining starting point E along the machining locus F for laser-beam machining.

In accordance with the present invention, a control means of the controller 10 is capable of determining which one of the laser-beam machining modes of FIGS. 3 and 4 should be selected in order to achieve highly efficient laser-beam machining. Usually, the quick-feed speed V0 is used only for shifting the laser beam projecting nozzle 9a from one point to another and is a comparatively high speed in the range of 100 to 200 mm/sec, while the machining speed V1 is used for moving the spot of the laser beam along the machining locus and is a comparatively low speed in the order of 30 mm/sec. Naturally, it should be understood that these values are not intended to restrict the present invention.

In accordance with the present invention, the approach time necessary for the laser beam projecting head 9a to travel from the position of origin OR of the machining locus F to the laser-beam machining starting point E on the machining locus F for each of the laser-beam machining modes shown in FIGS. 3 and 4 is calculated, the approach time for the laser-beam machining mode shown in FIG. 3 and that for the laser-beam machining mode shown in FIG. 4 are compared and examined, and then the laser-beam machining method is carried out in the laser-beam machining mode including the quick-feed operation only when the approach time required by the laser-beam machining mode including the quick-feed operation is shorter than that required by the laser-beam machining mode not including the quick-feed operation.

Figure 5:
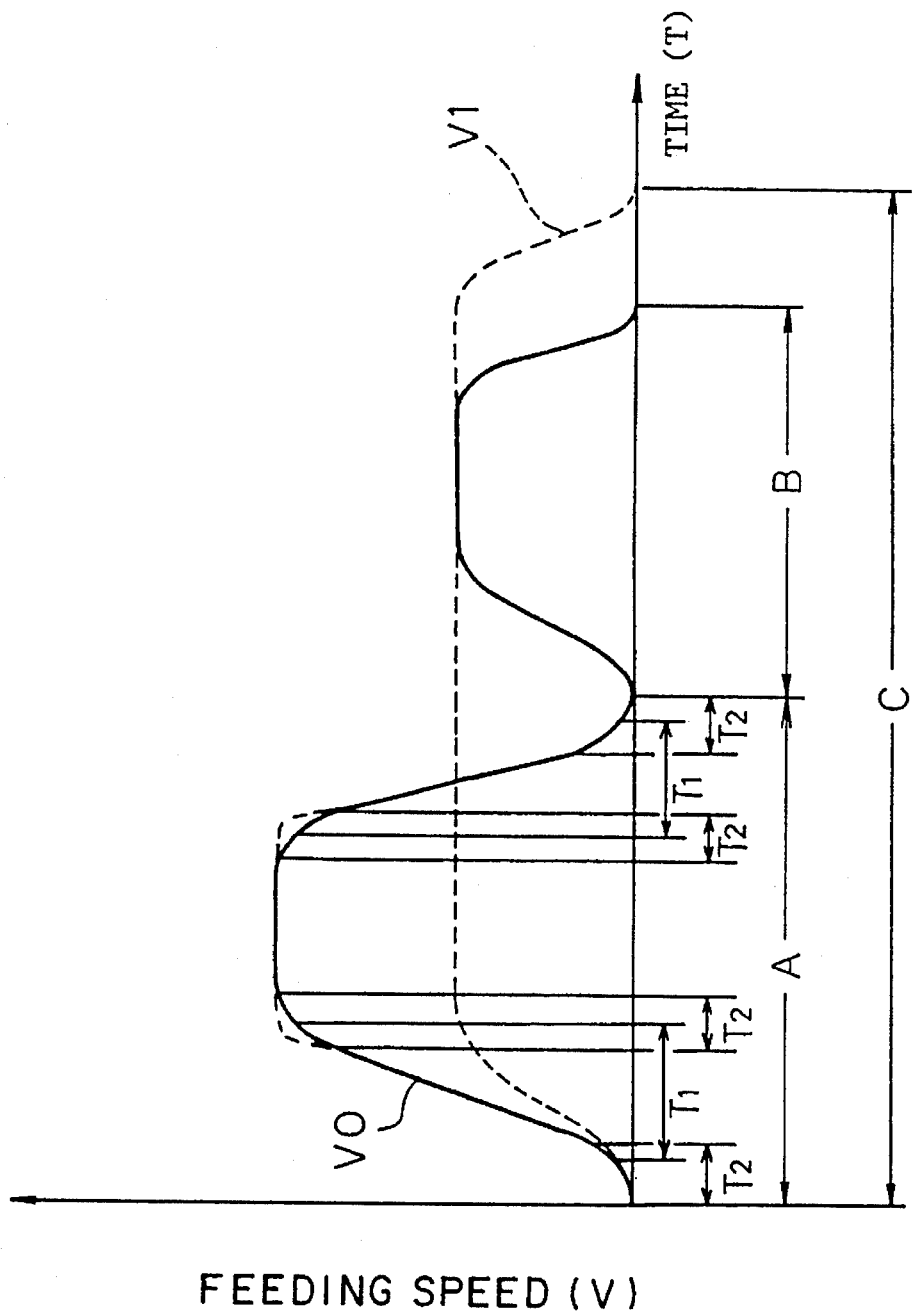
FIG. 5 is a graphical view illustrating the variation of the moving speed V of the laser beam projecting nozzle with time, and the time necessary for the laser beam projecting nozzle to reach a position corresponding to a point on a machining locus, for a laser-beam machining mode including quick-feed operation and a laser-beam machining mode not including quick-feed operation.
Figure 6:
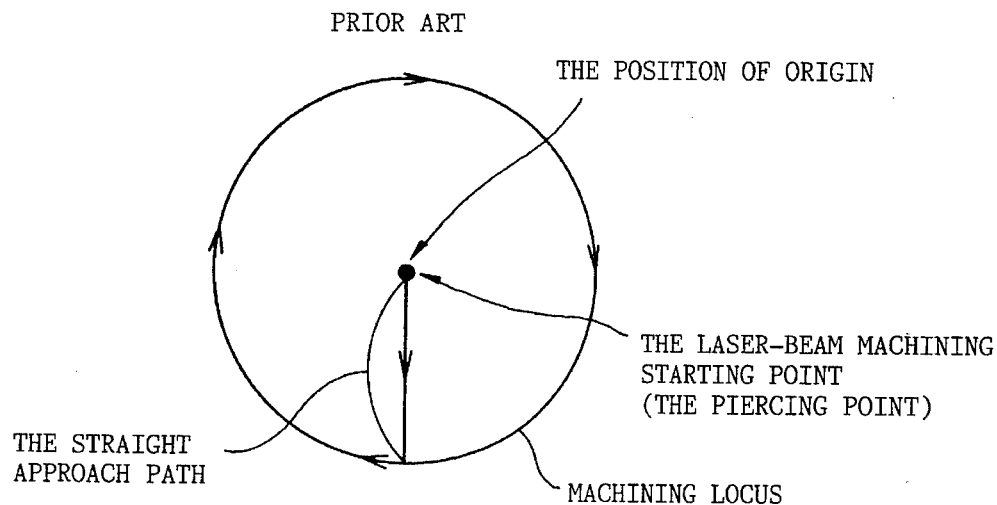
FIG. 6 is a diagrammatic view of assistance in explaining a conventional method of feeding a laser beam projecting nozzle in forming a small hole by the laser-beam machining operation of a laser-beam machining head driven by an additional-axis mechanism; and, FIG. 7 is a diagrammatic view of assistance in explaining another conventional method of feeding a laser beam projecting nozzle in forming a small hole by the laser-beam machining operation of a laser-beam machining head driven by an additional motion-axis means.
Figure 7:
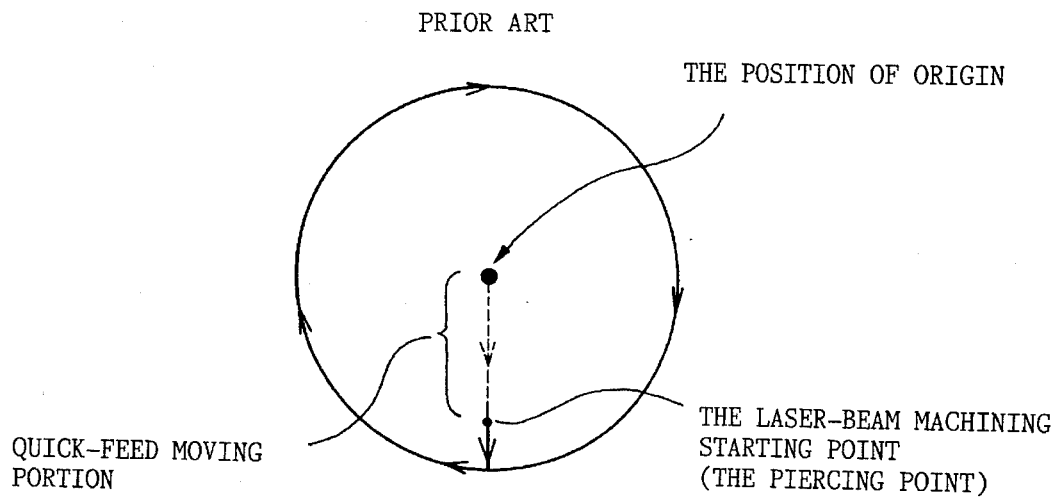

Referring to FIG. 5, in which feed speed is measured on the vertical axis (ordinate) and time is measured on the horizontal axis (abscissa), the laser-beam machining time necessary for completing the laser-beam machining of the work along the machining locus F in the laser-beam machining mode, indicated by a continuous solid line, including the quick-feed operation in the process of approach travel of the laser beam projecting nozzle, is A+B. The laser-beam machining time necessary for completing the same in the laser-beam machining mode, indicated by dotted line, in which laser-beam machining is started at the position of origin OR is C. In the present invention, the laser-beam machining times A+B and C are calculated to make a comparison between them.

In FIG. 5, T1 is time commonly necessary for both cases, i.e., the case wherein the moving speed of the laser-beam machining head 9 held at the position corresponding to the original position OR is increased from zero to the predetermined quick-feed speed V0, and the case wherein the moving speed of the laser-beam machining head is increased from zero to the predetermined machining speed V1. Namely, T1 is a first time.

On the other hand, T2 is time necessary for smoothly accelerating the laser-beam machining head 9 in the initial stage of acceleration or in the final stage of raising the moving speed to the predetermined quick-feed speed V0 or V1 and for smoothly decreasing the acceleration in the decelerating stage of the moving speed of the laser-beam machining head 9 to avoid sharp acceleration and deceleration. Namely, T2 is a second time constant. The time constants T1 and T2 are stored as machining conditions beforehand in the second memory of the robot controller 10.

In the machining mode including the quick-feed operation indicated by the solid line, the laser beam projecting nozzle 9a needs the time A to move from the position corresponding to the position of origin OR to the piercing point S and needs the time B to move at the machining speed V1 from the piercing point S to the laser-beam machining starting point E on the machining locus E after completing piercing. The laser beam projecting nozzle 9a requires time C to move at the machining speed V1 to the laser-beam machining starting point E after completing piercing at the position corresponding to the position of origin OR.

When a conditional expression, $$A+B<C \quad (1)$$

is satisfied, it is decided that the quick-feed operation is effective. When a conditional expression, $$A+B \geq C \quad (2)$$

is satisfied, it is decided that the quick-feed operation is ineffective.

The CPU of the robot controller calculates the laser-beam machining time A+B and C on the basis of the data stored in the first and second memories. The times A, B and C are calculated by using the following operation expressions for different cases as functions of the machining conditions, i.e., the distances R and L, the predetermined quick-feed speed V0, the predetermined machining speed V1 and the time constants T1 and T2, stored beforehand in the first memory.

Case 1

The moving speed of the laser beam projecting nozzle 9a can be increased from zero to the predetermined quick-feed speed V0 when the laser beam projecting nozzle 9a is moved in the laser-beam machining mode including the quick-feed operation along the straight path from the position corresponding to the position of origin OR to the position corresponding to the piercing point S (V0×T1<R−L).

$$A=[(R-L)-(V0\times T1)/V0]+2\times(T1+T2) \quad (3)$$

Case 2

The moving speed of the laser beam projecting nozzle 9a cannot be increased from zero to the predetermined quick-feed speed V0 when the laser beam projecting nozzle 9a is moved in the laser-beam machining mode including the quick-feed operation along the straight path from the position corresponding to the position of origin OR to the position corresponding to the piercing point S (V0×T1≥R−L).

$$A=[(R-L)/V0]+T1+(2\times T2) \quad (4)$$

Case 3

The moving speed of the laser beam projecting nozzle 9a can be increased to the predetermined quick-feed speed V when the laser beam projecting nozzle 9a is moved from the position corresponding to the piercing point S to the position corresponding to the laser-beam machining starting point E on the machining locus F in the laser-beam machining mode including the quick-feed operation (V1×T1<L).

$$B=[L-(V1\times T1)/V1]+2\times(T1+T2) \quad (5)$$

Case 4

The moving speed of the laser beam projecting nozzle 9a cannot be increased to the predetermined quick-feed speed V0 when the laser beam projecting nozzle 9a is moved from the position corresponding to the piercing point S to the position corresponding to the laser-beam machining starting point E on the machining locus F in the laser-beam machining mode including the quick-feed operation (V1×T2≥L).

$$B=(L/V1)+T1+(2\times T2) \quad (6)$$

Case 5

The moving speed of the laser beam projecting nozzle 9a can be increased from zero to the predetermined machining speed V1 after piercing when the laser beam projecting nozzle 9a is moved from the position corresponding to the original position OR to the position corresponding to the laser-beam machining starting point E on the machining locus F in the laser-beam machining mode not including the quick-feed operation (V1×T1<R).

$$C=[(R-V1)T1/V1]+2\times(T1+T2) \quad (7)$$

Case 6

The moving speed of the laser beam projecting nozzle 9a can be increased from zero to the predetermined machining speed V1 after piercing when the laser beam projecting nozzle 9a is moved from the position corresponding to the position of origin OR to the position corresponding to the laser-beam machining starting point E on the machining locus F in the laser-beam machining mode not including the quick-feed operation (V1×T1≥R).

$$C=R/V1+T1+(2\times T2) \quad (8)$$

The conditional expressions (1) and (2), and the operation expressions (3) to (8) are stored beforehand in the first memory of the robot controller 10, and the machining conditions are stored in the second memory. When controlling the feed operation of the additional motion-axis mechanism 8 to enable the laser-beam machining head 9 to achieve precision laser-beam machining, the CPU of the robot controller 10 executes calculation by using the conditional expressions (1) and (2) to decide whether or not the quick-feed operation is effective and, if the quick-feed operation is effective, automatically gives a quick-feed command through the interface 11 to the motor controller 12.

If the CPU decided that the quick-feed operation is ineffective, the CPU automatically provides a machining command requesting the execution of piercing at the position of origin OR at a machining speed specified in a laser-beam machining program and the start of laser-beam machining at the machining speed V0 from that position.

The graph of FIG. 5 used for the foregoing description shows an example of the variation of the feed speed V with time T; it may be readily understood that graphs for the cases 2, 4 and 6 are different from the graph of FIG. 5.

As is apparent from the foregoing description, according to the present invention, when carrying out precision laser-beam machining by moving the laser beam projecting nozzle of the laser-beam machining head, which is positioned and held beforehand at the position of origin OR of the machining locus by the robot operation of the movable components of the laser robot, along the machining locus F with the two drive motors MA and MB of the additional motion-axis mechanism of the laser robot, first the robot controller calculates the time necessary for moving the laser beam projecting nozzle along the straight approach path from the position of origin OR to a position corresponding to a point on the machining locus in a laser-beam machining mode in which laser-beam machining is started after carrying out piercing operation at the original position OR and the time necessary for moving the laser beam projecting nozzle along a straight approach path from the position of origin OR to a position corresponding to a point on the machining locus by another laser-beam machining mode in which the laser beam projecting nozzle is moved along a straight approach path from the position corresponding to the position of origin OR to a position corresponding to the piercing position on the straight approach path at a comparatively fast quick-feed speed, piercing operation is carried out at the piercing position, and then laser-beam machining is carried out at a comparatively slow machining speed, on the basis of the known machining conditions for the operation of the laser robot and the additional motion-axis mechanism, compares the calculated necessary times, and gives a quick-feed command automatically to the additional motion-axis mechanism to carry out laser-beam machining only when the necessary time required by the laser-beam machining mode in which the laser beam projecting nozzle is moved to the position corresponding to the predetermined piercing point at the quick-feed speed is shorter than the other necessary time. Accordingly, the operator's troublesome decision, using a trial-and-error method, is unnecessary and the precision laser-beam machining using the additional motion-axis mechanism of the laser robot is carried out automatically in the laser-beam machining mode including the quick-feed operation, which greatly improves the efficiency of the laser-beam machining. When the laser robot is operated for laser-beam machining, the time necessary for completing the machining of a workpiece can be readily curtailed regardless of the skill of the operator.

We claim:

1. A laser-beam machining method in which a laser beam projecting nozzle of a laser robot is fed by two feed motors for a straight approach travel along a straight approach path from a position corresponding to a predetermined position of origin on a workpiece to a position corresponding to a starting position of a desired machining locus, and subsequently the laser beam projecting nozzle is fed from the starting position along the desired machining locus, comprising:

presetting a distance R of the straight approach travel, a quick-feed speed V0, a machining speed V1, respective time constants indicating respective times necessary for the feed speed to increase from zero to the set quick-feed speed, and necessary for the machining speed to increase from zero to the set machining speed as machining conditions;

calculating, on the basis of the machining conditions, a first approach time necessary for machining the workpiece by a laser beam from the position of origin selected as a piercing position where the laser beam projected from the laser beam projecting nozzle pierces the workpiece to the starting position set on the desired machining locus at a predetermined machining speed along a straight approach path;

calculating, on the basis of the machining conditions, a second approach time necessary for selecting a predetermined piercing position near the starting position set on the straight approach path, quick-feeding the laser beam projecting nozzle from a position corresponding to said position of origin to a position corresponding to said predetermined piercing position at a quick-feed speed faster than said predetermined machining speed, and carrying out laser-beam machining after piercing the workpiece from a predetermined point on said straight approach path to said starting position at said machining speed by feeding the laser beam projecting nozzle along a straight path;

comparing said first and second approach times; and quick-feeding the laser beam projecting nozzle from the position corresponding to said position of origin to the position corresponding to said predetermined piercing position only when said second approach time is shorter than said first approach time.

2. A multi-articulated laser robot including a multi-articulated laser robot unit, and an additional motion-axis means provided with two feed motors for feeding the laser beam projecting nozzle of the laser robot unit for a straight approach travel along a straight approach path from a position corresponding to a predetermined position of origin on a workpiece to a position corresponding to a starting position on a desired machining locus, and feeding the laser beam projecting nozzle from the position corresponding to the starting position along the desired machining locus, and control means for controlling the operation of the additional motion-axis means, said control means comprising in combination:

a storage means capable of storing, as preset machining conditions, a distance R for said straight approach travel, a predetermined quick-feed speed V0, a predetermined machining speed V1, respective time constants corresponding to respective times necessary for a feed speed to increase from zero to said predetermined quick-feed speed, and necessary for a machining speed to increase from zero to said predetermined machining speed;

a calculating means capable of calculating, on the basis of said machining conditions stored in said storage means, a first approach time necessary for machining the workpiece by a laser beam from said position of origin selected as a piercing position where the laser beam projected from said laser beam projecting nozzle pierces the workpiece to said starting position on said desired machining locus at said predetermined machining speed along a straight path, and a second approach time necessary for quick-feeding the laser beam projecting nozzle from a position corresponding to said position of origin to a position corresponding to a predetermined piercing position at said predetermined quick-feed speed faster than said predetermined machining speed by selecting said predetermined piercing position at a position near said starting position on said straight approach path, and for carrying out the laser-beam machining after piercing the workpiece from a predetermined point on the straight approach path to said starting position at said machining speed by feeding the laser beam projecting nozzle along a straight path; and a command control means for providing a quick-feed command to said two drive motors only when said second approach time is determined to be shorter than said first approach time from comparison of said first and second times calculated by said calculating means.

3. A multi-articulated laser robot according to claim 2, wherein said storage means comprises a random access memory (RAM) arranged so as to be rewritten therein.

4. A multi-articulated laser robot according to claim 2, wherein said command control means for providing a quick-feed command to said two feed motors comprises a motor control means arranged so as to be connected to said calculating means by an interface means.

5. A multi-articulated laser robot according to claim 2, wherein said control means is built in and accommodated in a robot control means of said multi-articulated laser robot.

* * * * *